United States Patent
Henshaw et al.

(10) Patent No.: US 6,839,980 B2
(45) Date of Patent: Jan. 11, 2005

(54) DETERMINATION OF DISPLACEMENT

(75) Inventors: James Reynolds Henshaw, Stroud (GB); Richard John Hoodless, Bristol (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/380,516

(22) PCT Filed: Sep. 18, 2001

(86) PCT No.: PCT/GB01/04161

§ 371 (c)(1),
(2), (4) Date: Mar. 14, 2003

(87) PCT Pub. No.: WO02/25219

PCT Pub. Date: Mar. 2, 2002

(65) Prior Publication Data

US 2004/0003510 A1 Jan. 8, 2004

(30) Foreign Application Priority Data

Sep. 22, 2000 (GB) .............................................. 0023289

(51) Int. Cl.⁷ .............................................. G01B 21/16
(52) U.S. Cl. ....................................................... 33/706
(58) Field of Search ........................... 33/706, 707, 708

(56) References Cited

U.S. PATENT DOCUMENTS

| | | | | |
|---|---|---|---|---|
| 4,564,294 A | * | 1/1986 | Ernst ........................... | 33/707 |
| 4,631,403 A | * | 12/1986 | Rieder et al. .................. | 33/707 |
| 5,065,525 A | * | 11/1991 | Szenger ........................ | 33/702 |
| 5,302,820 A | | 4/1994 | Henshaw et al. | |
| 5,856,668 A | | 1/1999 | Nelle et al. | |
| 6,272,766 B1 | * | 8/2001 | Tondorf et al. ................ | 33/706 |
| 6,442,861 B1 | * | 9/2002 | Boge et al. .................... | 33/706 |
| 6,571,486 B1 | * | 6/2003 | Tondorf et al. ................ | 33/706 |

FOREIGN PATENT DOCUMENTS

| | | |
|---|---|---|
| EP | 0 416 391 A2 | 3/1991 |
| JP | A 62-135725 | 6/1987 |
| WO | WO 98/23924 | 6/1998 |

\* cited by examiner

Primary Examiner—Christopher W. Fulton
(74) Attorney, Agent, or Firm—Oliff & Berridge, PLC

(57) ABSTRACT

Disclosed is an optical measurement scale 14 complementary scale reader 10 for determining displacement between the scale and reader. The scale 14 and reader 10 are adapted for use with a liquid C which provides optical communication between the scale 14 and the reader 10. The liquid C is preferably machine coolant or oil. The scale is preferably a stainless steel strip having periodic markings thereon. The scale reader has a window 16 which may have a hard coating (30 FIG. 4) thereon, e.g. diamond-like carbon, to prevent surface damage. The scale and reader may be mutually displaced with a shortage of liquid without undue adverse affects. Rotary mutual displacement between the scale and reader is discussed.

11 Claims, 4 Drawing Sheets

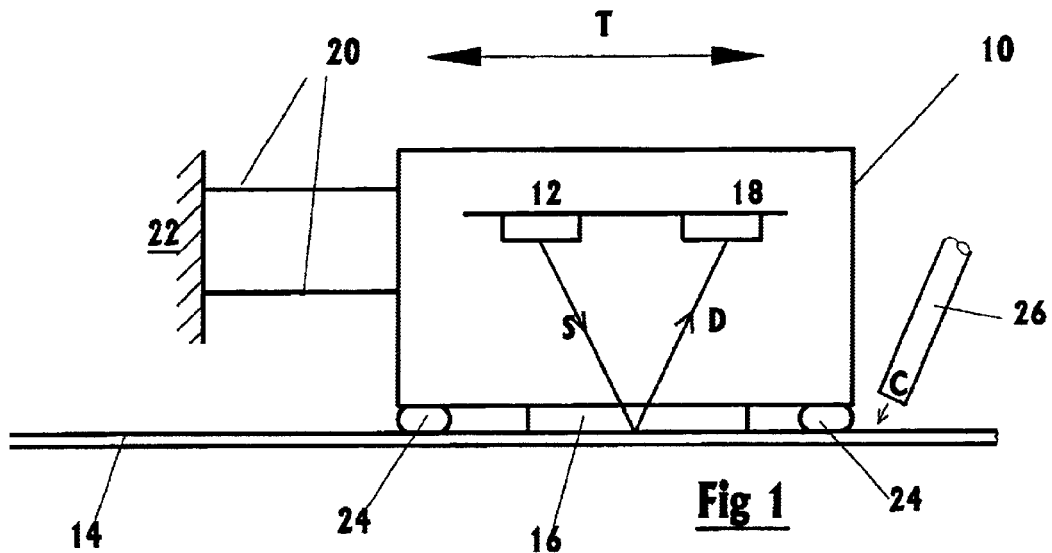
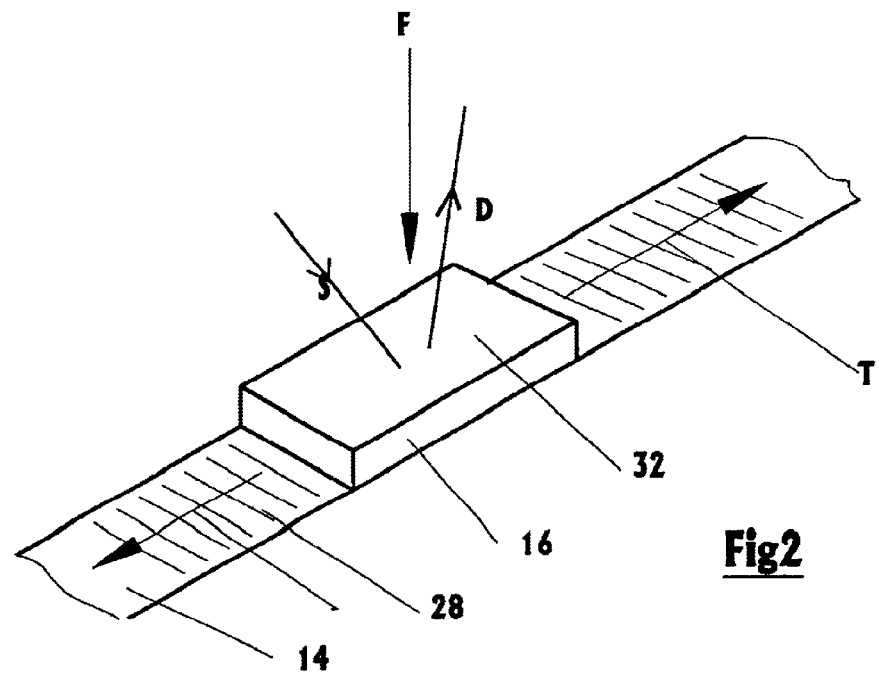

section A-A**

DETERMINATION OF DISPLACEMENT

The present invention is concerned with the determination of displacement and relates to an arrangement of an optical scale and scale reader, and a scale or scale reader adapted for the arrangement.

Conventionally a scale and scale reader rely on complementary optical elements to produce a periodic signal indicative of relative movement between the scale and scale reader. Typically there is an elongate scale which has a fine pattern with periodically alternating reflective or light transmissive qualities in the direction of elongation. A scale reader is arranged to travel back and forth in the direction of elongation and has one or more gratings through which light may pass. This light has been reflected off or passed through the scale. A light detector behind the grating or gratings enables the alternating bands of light which are produced as the reader moves relative to the scale to be counted. An exact air gap is usually maintained between the scale and reader (a so-called "ride height").

Such a system demands very clean conditions for accurate counting of the light bands. One method of ensuring cleanliness is to enclose the scale and reader in a protective housing.

A protected scale and reader is shown in U.S. Pat. No. 5,856,668. In that document the scale is enclosed in a channel in order to keep it free from debris. In such a system seals are used to enclose the scale. These seals are prone to wear and cause friction which results in hysteresis from the drag on the readhead.

A machine tool environment is generally wet and dirty and even protected scales are prone to contamination in this environment. For example, dirty machine coolant in the form of emulsified oil may contaminate the scale, or condensation may be present. The contamination causes false counts of light bands and permanent scratches on the scale and/or reader parts. Additionally complete blocking of the gap between the scale and reader may occur, caused by e.g. flooding coolant or debris contamination. Thus a scale and reader arrangement that could operate successfully without complicated protection would be advantageous, as would an arrangement whereby some contamination and damage to the various elements of the scale and reader would not degrade significantly a movement determination signal from a light detector.

Preferred embodiments of the present invention make an unprotected scale and reader possible. Furthermore a scale and reader are proposed which are operable with damage to the scale and reader parts that slide relative to each other.

According to the present invention there is provided displacement determination apparatus comprising a scale reader being adapted for use with a liquid support.

According to another aspect the invention provides a displacement determination device including a scale and scale reader adapted for mutual optical communication via a liquid.

According to another aspect the invention provides a displacement determination device including a scale and complementary scale reader both adapted for use with a liquid between the scale and the reader.

Preferably the scale and complementary scale reader are separated during respective relative movement by a thin film of liquid.

Preferably the scale reader includes a transparent window, on which may be formed a grating. Preferably, the scale is elongate and has a generally flat surface. The window may be free to move with respect to a support in order to accommodate deviations in the flatness of the scale surface, but movement in a plane parallel to the plane of the scale surface may be constrained.

Thus this partial movement allows the window to move to follow any undulations in the flatness of the scale but its position relative to its direction of travel along the scale, side-to-side and yaw motion are controlled.

The surface of the window nearest the scale, in use, may have a scratch resistant coating, possibly a diamond-like carbon (DLC) coating.

The reader may include at least one wiper element in front of the window in the direction of travel. This element may be an absorbent pad for wetting the scale and/or removing debris. The reader may have a supply for liquid.

According to another aspect the invention provides a displacement determination device including a scale and scale reader adapted for mutual contact.

The mutual contact may take place in the absence of liquid.

Illustrative embodiments will now be described with reference to the drawings in which:

FIG. 1 shows a schematic view of the scale and scale reader according to the invention;

FIG. 2 shows a perspective view of some of the parts shown in FIG. 1;

Whilst the invention will be described in detail in relation to its use with machine tools, it should be understood that this is illustrative only of one particular application and that many other applications are possible within the scope of the invention. Also, whilst linear movements are depicted, angular or other nonlinear displacement determination is possible with this invention e.g. determination of displacement in two dimensions in a plane.

Figure 4:
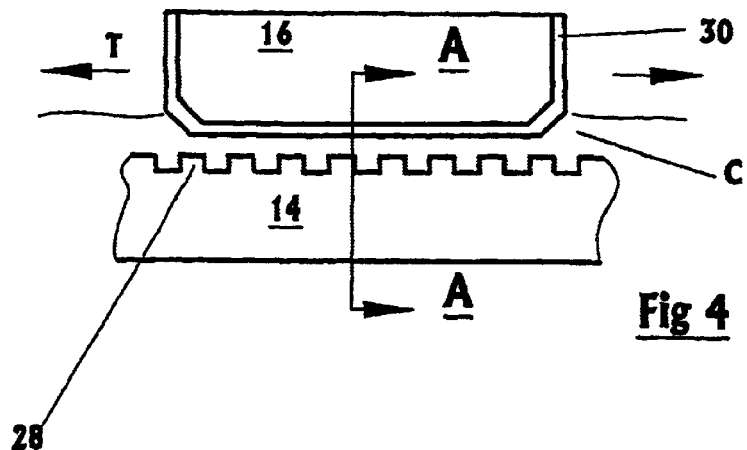
FIG. 4 shows details of the interface between the scale and scale window shown in FIGS. 1, 2 and 3.

FIG. 1 shows a measurement scale 14 which has periodic markings (28 FIGS. 2 and 4, shown out of proportion). Typically such markings are at 40 micron intervals, but may be any period. The scale may be of stainless steel material. An example of a scale reader 10 of which there are many variants is shown in schematic form. Light emitter 12 produces light S which travels through grating (32 FIGS. 2 and 5) on window 16 (without significant effect) and is reflected by scale 14. Light D then travels again through grating 32. Interference fringes are produced when the light travels through the grating 32 which can be detected by detector 18. The fringes can be counted as the reader 10 travels relative to the scale 14 in the directions of arrow T. Grating 32 is shown as a phase grating. Other gratings or combinations of gratings are possible. One such alternative being shown in U.S. Pat. No. 5,302,820.

The window 16 and scale 14 have an interface (shown in detail at FIGS. 4, 5 and 6), and described below) at which there is a thin film of liquid C e.g. of thickness between 1 $\mu$m and 50 $\mu$m, in this case machine coolant. The coolant C is supplied by pipe 26.

In conventional systems the ride height of the reader above the scale maybe accurately determined with mechanical bearings, slides and the like supplemental to any machine bearings or slides. The present system allows the ride height to be determined by hydrodynamic pressure in the liquid interface or by direct contact should the liquid interface be lost. In this manner there are no exposed supplemental mechanical bearings or slides to become contaminated by, for example, swarf. The ride height will not change substantially over time. In this arrangement, the reader unit 10 is sealed and waterproof to prevent ingress of liquid or debris.

FIG. 2 shows the scale 14 and window 16. The relative travel directions T and light paths S and D as previously described are shown also. In order that the scale 14 and window 16 are held together, a preload F is applied to the reader 10. This preload will not be sufficient to destroy the hydrodynamic pressure at the liquid interface.

Figure 3:
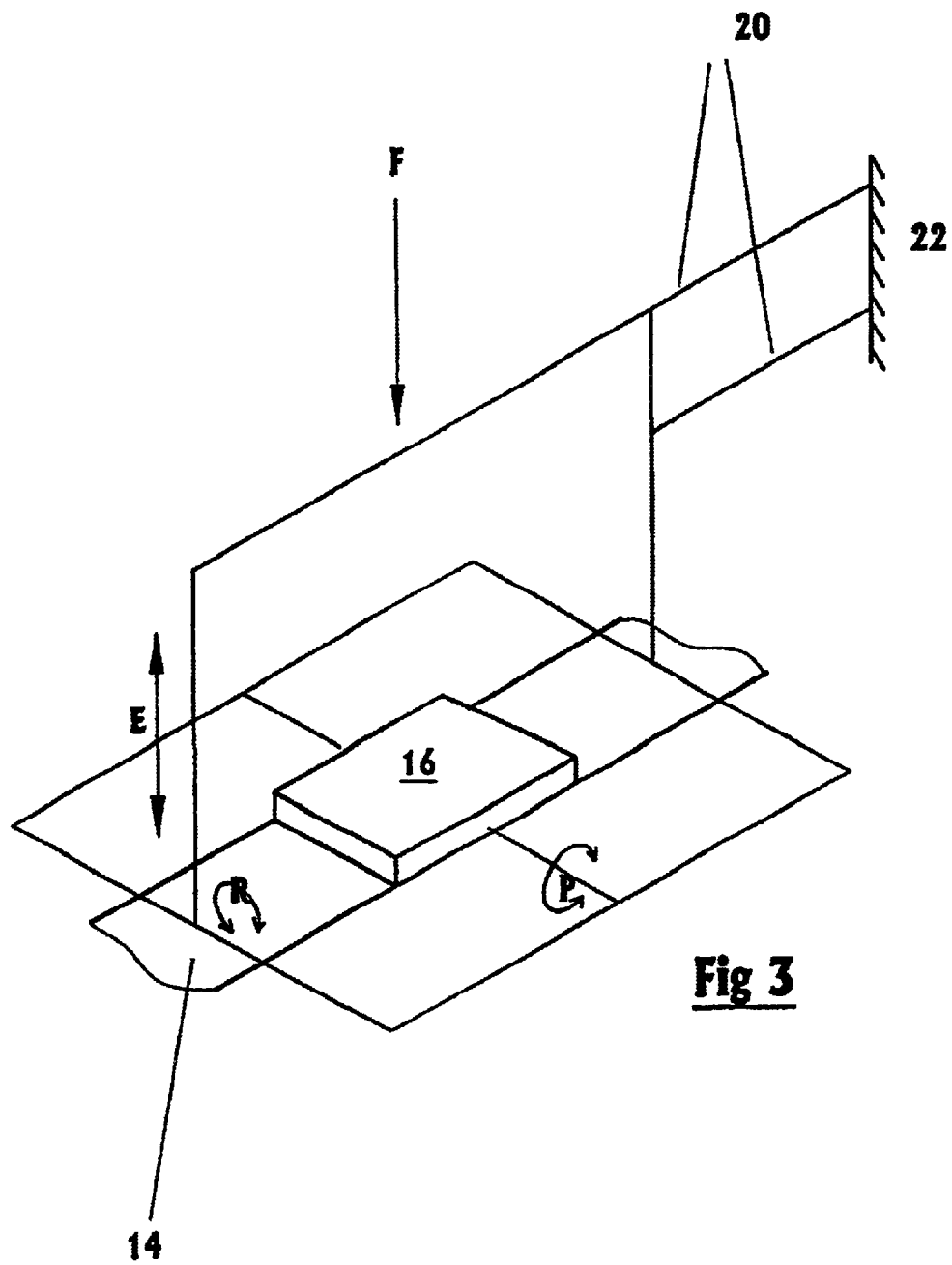
FIG. 3 shows a schematic view of the allowable movement of the parts shown in FIG. 2.

FIG. 3 illustrates the partial freedoms of movement of the window 16 with respect to the scale 14. Some freedom is desirable so that the grating 16 can follow the scale 14 even if the scale is not truly flat. For example the scale, or more likely the surface to which it is attached might be warped, bowed or twisted. The three arrows E,R and P indicate the freedoms of movement of the grating 16 which together with the liquid will allow the grating 16 to follow the surface of the scale 14 at an accurate height. The degrees of freedom are elevation E of the window, roll R and pitch P. Elevation E may be provided by two resilient members 20, in this case positioned in parallel. The members 20 may be flat springs and movement E may therefore be parallel to a support 22. The resilient members 20 may be used to provide the preload F. Of course a separate spring may provide the preload F and resilient members 20 may be substituted for a parallel linkage. Roll R and pitch P may be provided by a gimbal arrangement. The gimbal may have one rotational axis in line with the scale 14 and one axis perpendicular to the extent of the scale. With this arrangement the window 16 may follow the surface of the scale 14 even though it is not completely flat. However movements in the direction of travel T and side-to-side movement and yaw (rotation about an axis perpendicular both to axes R and P relative to support 22) are restricted, i.e. any movement in a plane parallel to the plane of the scale is restricted.

FIG. 4 shows an enlarged view of the scale and reader interface. Scale markings 28 are shown as is the DLC coating 30. Neither are shown to scale. Liquid C is shown between the scale 14 and window 16.

Figure 5:
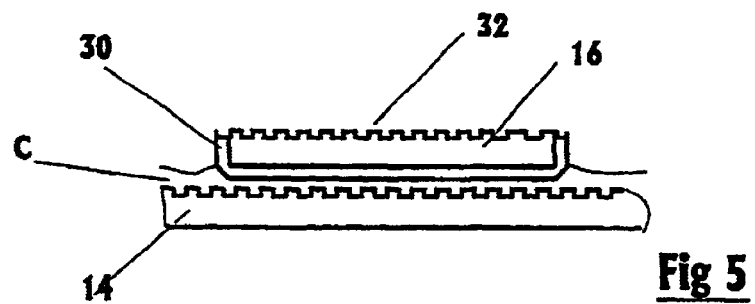
FIG. 5 shows an enlarged view of FIG. 4.

FIG. 5 shows a further enlarged view of the scale and reader. The window has two faces, one of which is in contact with the liquid C thereby providing optical communication between the scale and the reader via the liquid, and the other face having the grating formed thereon. The grating marks 32 are shown, again not to scale, formed directly onto the upper surface of window 16, e.g. by means of etching. A separate grating is possible.

Figure 6:
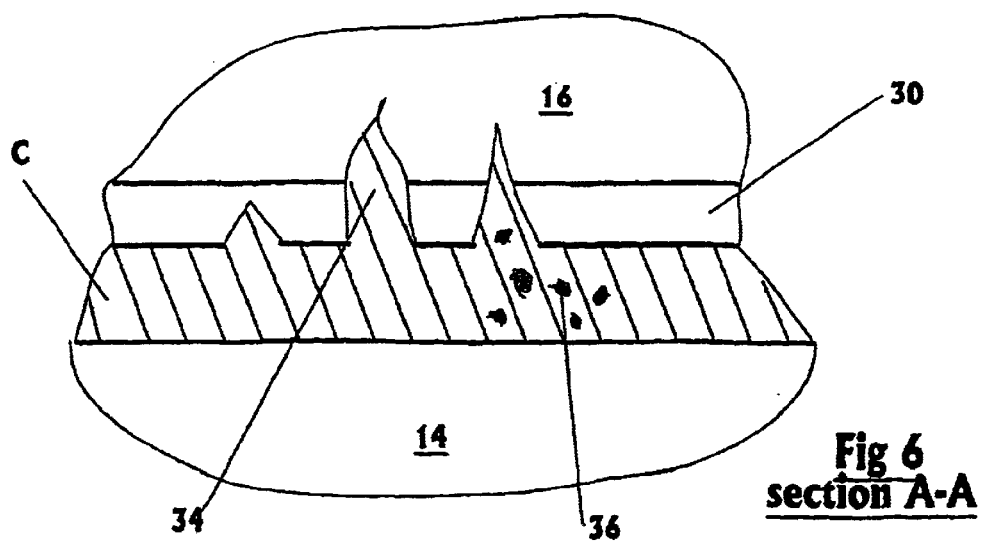
FIG. 6 shows a further enlarged view at section A,A of FIG. 4.

FIG. 6 shows a partial sectional view across the window 16 of FIG. 4 and is enlarged for clarity. For the purposes of illustration, possible scratches 34 are shown which may occur as a result of contamination 36 in machine coolant say.

Typically where air is the medium in which light S propagates the change in refractive index between the air and a window will cause unacceptable scattering of the light when scratches 34 are present. Such scratches would be detrimental to the operation of the measurement system. The light scatt ring is caused by the high angle of incidence between the light S and the surface of the scratch and the irregularity of a scratch surface. However, in the present invention, since the refractive indices of a liquid and window 16 are much closer then the effect of the scratches is not particularly significant. So, where the window or its DLC coating is scratched the light S is not scattered and displacement determination can still take place. The liquid will fill the scratches and therefore refractive effects will be minimal. The scratch will be filled sufficiently with liquid even when there is a shortage of liquid on the scale.

Figure 7:
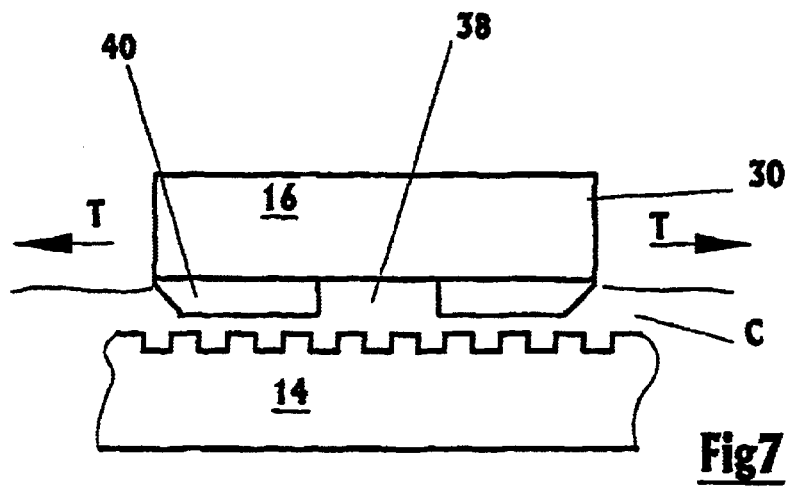
FIG. 7 shows an alternative embodiment according to one aspect of the invention.

FIG. 7 shows an alternative window 16. A pad 40 is secured (e.g. by means of adhesive) to the lower face of the window. The pad may be formed from a bearing material e.g. P.T.F.E. or phosphor-bronze. The pad 40 does not cover an area 38 at which light S and D will pass. Any contact between the scale 14 and pad 40 should not scratch the light conductive part of the window 16.

The area must be supplied directly with liquid C and the liquid may be pressurised.

Figure 8:
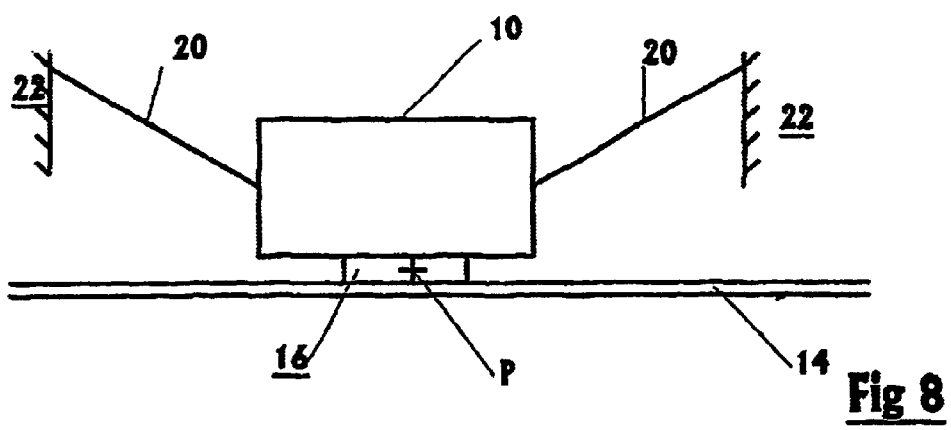
FIGS. 8 and 9 show alternative arrangements of scale reader support according to another aspect of the invention.
Figure 9:
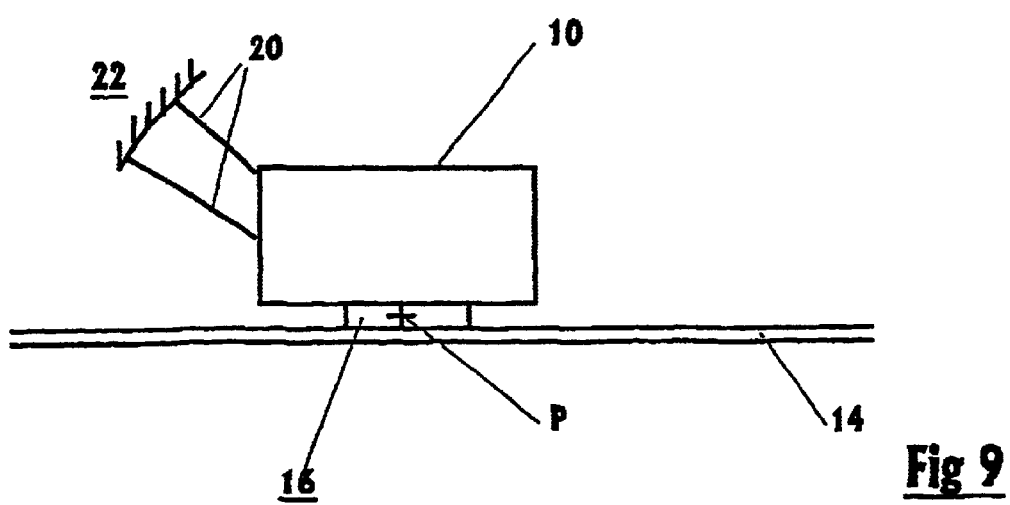

FIGS. 8 and 9 show alternative arrangements for supporting the scale reader 10. Two members 20 are again shown for guiding and supporting the reader relative to a support 22. The members 20 are planar flexures of substantially equal length which are mounted in planes which converge at the pivot point P. The pivot point is coincident with the axis about which partial pitch rotation P (in FIG. 3) may take place, i.e. at the interface between the window and the scale.

The two arrangements illustrated in FIGS. 8 and 9 allow and restrict the same movements described above in reference to FIG. 3. Pitch P, roll R and elevation E are all possible because the members 30 of FIGS. 8 and 9 have compliance (i.e. buckle and bend) and in tandem provide the necessary movement of the window to accommodate any deviation in the flatness of the scale.

Many modifications are possible within the scope of the invention. In particular the window 16 and grating 32 have been illustrated as one element (e.g. FIG. 5). However since the surface of the window may become scratched (possibly even the window shown in FIG. 7) it may be beneficial to have a grating 32 separate from the window 16. This separate window only may be coated with DLC and may be replaceable as a service item, should it become scratched. The window may be of sapphire material i.e. softer than DLC so that it does not degrade the scale's surface if it rubs that surface. Elements 24 may be provided for wetting the scale as the reader travels, and may be used additionally or alternatively for wiping away any debris on the scale. These elements 24 may be in the form of absorbent pads.

The elements 24 may be shaped to remove relatively large debris (like a snowplough for removing machining swarf for example).

The reader 10 may move relative to the scale 14, the scale 14 may move relative to the reader 10, or both may move, in any case the relative displacement will be determined.

Also the liquid C may be other than machine coolant. It may be any liquid and may be supplied in any manner for example: simply a bath of liquid in which the scale is immersed; pumped; gravity fed; or wicked e.g. to elements 24. Oil is a suitable liquid for use in this application, and has an advantage over machine coolant in that it does not dry-up like coolant. Water may be used e.g. in underwater applications. Where coolant or another emulsion is used detergent may be introduced to maintain emulsification.

Whilst the invention has been described and illustrated having a liquid film between a scale and a reader window, the possibility exists that this arrangement could become dry such that there is little or no fluid interface. In such a situation there will be contact between the scale and the window. Experimentation has shown that the arrangements described herein are capable of running "dry" without significant detriment. In particular a DLC coating on the window provides good scratch resistance when "dry" running occurs. However, a liquid interface causes far less wear on the scale and window than dry running.

The scale may not be of the reflective type shown, but may be transparent, in which case the light emitter 12 may be disposed on the opposite side to the window 15 and light S will propagate through the scale to the window/liquid interface, through the window and grating and onto the detector 18. Th re may be a liquid interface between the opposed light emitter and the scale.

The lead edge(s) of the window 16 or pad 40 may be profiled, a chamfer is shown. This profile may assist in removing debris in the path of the grating and/or help to lift the window as it travels. The profile may be for example rounded, stepped or a sharpened edge. A rounded edge has been found to reduce chipping of the DLC coating on the window and hence is preferred for the windows shown in FIGS. 4, 5 and 6.

In order to produce favourable dynamic effects at the liquid interface, a preferred combination of window profile and area, load F, and liquid viscosity may be determined by experimentation.

Whilst all the drawings show the reader on top of the scale, the invention is not so limited. Any orientation of the scale and reader parts are possible, e.g. the scale may be positioned above the window. In such orientations the liquid interface is maintained.

The scale and reader shown are linear (and commonly called a linear encoder). However, a rotary mutual displacement between the scale and reader is possible within the ambit of the invention (commonly called a rotary encoder).

Since the amount of light reaching light detector 18 may vary due to changes in scale reader position and scale degradation then an automatic gain control may be employed to keep substantially constant the signal issued by the reader.

What is claimed is:

1. A displacement determination apparatus comprising a scale and a scale reader, the scale reader is supported on the scale by a liquid.

2. A displacement determination device as claimed in claim 1 wherein the scale reader includes a transparent window, at which is formed a grating.

3. A displacement determination device as claimed in claim 2 wherein the window has two faces, one of which is adapted for supporting the liquid, and the other of which has the grating formed thereon.

4. A displacement determination device as claimed in claim 2 wherein the scale is elongate and has a generally flat surface.

5. A displacement determination device as claimed in claim 2 wherein the window is free to move with respect to a support in order to accommodate deviations in the flatness of the scale surface.

6. A displacement determination device as claimed in claim 5 wherein movement of the window transverse to the direction of elongation of the scale is inhibited.

7. A displacement determination device as claimed in claim 1 wherein the scale and scale reader are arranged to contact in the absence or shortage of the liquid.

8. A displacement determination device as claimed in claim 1 wherein the window has a coating.

9. A displacement determination device as claimed in claim 1 wherein the coating is diamond-like carbon.

10. A displacement determination device comprising a scale and a scale reader, the scale reader being supported in use on the scale by a liquid.

11. A displacement determination device comprising a scale and a scale reader, the scale and scale reader having a liquid interface there between which provides support for the scale or scale reader.

* * * * *